US010224570B2

(12) United States Patent
Abe et al.

(10) Patent No.: US 10,224,570 B2
(45) Date of Patent: Mar. 5, 2019

(54) NONAQUEOUS ELECTROLYTE SECONDARY BATTERY

(71) Applicant: TOYOTA JIDOSHA KABUSHIKI KAISHA, Toyota-shi, Aichi (JP)

(72) Inventors: Takeshi Abe, Toyota (JP); Toshiyuki Kawai, Toyota (JP); Akira Kouyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 474 days.

(21) Appl. No.: 14/785,049

(22) PCT Filed: Mar. 28, 2014

(86) PCT No.: PCT/JP2014/059319
§ 371 (c)(1),
(2) Date: Oct. 16, 2015

(87) PCT Pub. No.: WO2014/171310
PCT Pub. Date: Oct. 23, 2014

(65) Prior Publication Data
US 2016/0079629 A1   Mar. 17, 2016

(30) Foreign Application Priority Data

Apr. 17, 2013   (JP) ................. 2013-086347

(51) Int. Cl.
*H01M 10/0569* (2010.01)
*H01M 10/0525* (2010.01)
*H01M 4/587* (2010.01)
*H01M 4/505* (2010.01)
*H01M 10/052* (2010.01)
*H01M 10/0567* (2010.01)
*H01M 10/0587* (2010.01)
*H01M 4/525* (2010.01)
*H01M 4/02* (2006.01)

(52) U.S. Cl.
CPC ....... *H01M 10/0569* (2013.01); *H01M 4/505* (2013.01); *H01M 4/525* (2013.01); *H01M 4/587* (2013.01); *H01M 10/052* (2013.01); *H01M 10/0525* (2013.01); *H01M 10/0567* (2013.01); *H01M 10/0587* (2013.01); *H01M 2004/027* (2013.01); *H01M 2004/028* (2013.01); *H01M 2220/20* (2013.01); *H01M 2220/30* (2013.01); *H01M 2300/002* (2013.01); *H01M 2300/004* (2013.01); *H01M 2300/0034* (2013.01); *H01M 2300/0037* (2013.01)

(58) Field of Classification Search
CPC combination set(s) only.
See application file for complete search history.

(56) References Cited

U.S. PATENT DOCUMENTS

| 5,633,099 A * | 5/1997 | Yokoyama ............. C07C 69/96 252/62.2 |
| 6,210,835 B1 | 4/2001 | Arai |
| 2012/0164532 A1 | 6/2012 | Senoue et al. |
| 2013/0224606 A1 | 8/2013 | Koh et al. |

FOREIGN PATENT DOCUMENTS

| CN | 104025366 A | 9/2014 |
| JP | 11-307123 A | 11/1999 |
| JP | 2005-78820 A | 3/2005 |
| JP | 2007-294433 A | 11/2007 |
| JP | 2010-238510 A | 10/2010 |
| JP | 2011-233535 A | 11/2011 |
| JP | 2012-32343 A | 2/2012 |
| JP | 2012-142157 A | 7/2012 |
| JP | 2012-216490 A1 | 11/2012 |
| JP | 2012-238608 A | 12/2012 |
| JP | 2013-55074 A | 3/2013 |
| WO | 2013/100081 A1 | 7/2013 |

OTHER PUBLICATIONS

JP 2010-238510—Translation.*
International Search Report for PCT/JP2014/059319 dated Jul. 1, 2014 [PCT/ISA/210].

* cited by examiner

*Primary Examiner* — Ladan Mohaddes
(74) *Attorney, Agent, or Firm* — Sughrue Mion, PLLC

(57) ABSTRACT

The invention provides a lithium ion secondary battery which exhibits excellent output characteristics and in which decline in the power characteristics is suppressed for a long period of time even after charge-discharge cycling. The lithium ion secondary battery includes a positive electrode, a negative electrode and a nonaqueous electrolyte solution. The positive electrode has a maximum achievable potential of 4.5 V or more versus metallic lithium. The nonaqueous electrolyte solution includes (A) a nonfluorinated cyclic carbonate, (B) a fluorinated cyclic carbonate, and (C) a fluorinated acyclic carbonate. The nonfluorinated cyclic carbonate (A) accounts for more than 10% by volume of (A), (B) and (C) combined.

12 Claims, 6 Drawing Sheets

NONAQUEOUS ELECTROLYTE SECONDARY BATTERY

CROSS REFERENCE TO RELATED APPLICATIONS

This application is a National Stage of International Application No. PCT/JP2014/059319, filed on Mar. 28, 2014, which claims priority from Japanese Patent Application No. 2013-086347, filed on Apr. 17, 2013, the contents of all of which are incorporated herein by reference in their entirety.

TECHNICAL FIELD

The present invention relates to a nonaqueous electrolyte secondary battery. More specifically, the invention relates to a nonaqueous electrolyte secondary battery having a working range of 4.5 V and above.

This application claims priority from Japanese Patent Application No. 2013-086347 filed on Apr. 17, 2013, the entire contents of which are incorporated herein by reference.

BACKGROUND ART

Secondary batteries such as lithium secondary batteries and nickel-hydrogen batteries are used as on-board power sources in electricity-powered vehicles, or as power sources installed in personal computers, handheld devices and other electrical products. In particular, nonaqueous electrolyte secondary batteries, typically lithium secondary batteries that are lightweight and able to achieve a high energy density, are suitable as high-output power sources for on-board use in vehicles such as electric vehicles and hybrid vehicles. Attempts have been made to optimize the compositions of, e.g., the positive and negative electrode active materials and the nonaqueous electrolyte solution in order to achieve the desired power generating characteristics in such nonaqueous electrolyte secondary batteries (see Patent Literature 1 and 2). In addition, the use of a positive electrode active material having a working potential higher than 4.3 V versus metallic lithium has been proposed as a way of further enhancing the high-energy density characteristics in nonaqueous electrolyte secondary batteries.

CITATION LIST

Patent Literature

Patent Literature 1: Japanese Patent Application Publication No. 2007-294433
Patent Literature 2: Japanese Patent Application Publication No. 2011-233535
Patent Literature 3: Japanese Patent Application Publication No. 2012-032343

SUMMARY OF INVENTION

Technical Problem

As noted above, using a positive electrode active material having a higher working potential can be an extremely effective way to achieve a higher energy density. However, on the other hand, with repeated charging and discharging to high voltages using a positive electrode active material having a high working potential, there has been a risk of the organic solvent within the nonaqueous electrolyte solution undergoing oxidative degradation at the surface of the positive electrode, leading to a decline in the cycle performance. In particular, by repeatedly charging and discharging under conditions where the positive electrode has a maximum achievable potential versus metallic lithium of 4.5 V or more (the potential versus metallic lithium is sometimes denoted below as "vs. Li/Li$^+$"), the possibility of oxidative degradation of the nonaqueous electrolyte solution may become even higher. On account of this, maintaining the battery capacity over a long period of time has been difficult.

This invention relates to an improvement in nonaqueous electrolyte secondary batteries which use a positive electrode having a high upper limit working potential (4.5 V (vs. Li/Li$^+$) or more). The object of the invention is to provide a nonaqueous electrolyte secondary battery which, even when repeatedly used at such a high potential, is able to suppress oxidative degradation of the nonaqueous electrolyte.

Solution to Problem

To achieve this object, the invention provides a nonaqueous electrolyte secondary battery which includes a positive electrode, a negative electrode and a nonaqueous electrolyte solution. In this nonaqueous electrolyte secondary battery, the positive electrode has a maximum achievable potential of 4.5 V or more versus metallic lithium. The nonaqueous electrolyte solution includes (A) a nonfluorinated cyclic carbonate, (B) a fluorinated cyclic carbonate, and (C) a fluorinated acyclic carbonate. The nonfluorinated cyclic carbonate (A) accounts for more than 10% by volume of (A), (B) and (C) combined.

In a nonaqueous electrolyte secondary battery where the positive electrode has a maximum achievable potential of 4.5 V or more (vs. Li/Li$^+$), it is known that not only electrochemical reactions, but also the side reaction of oxidative degradation of the nonaqueous electrolyte solution readily arise at the surface of the positive electrode, lowering the cycle performance of the battery. It is also known that this side reaction can be effectively suppressed by using a fluorinated organic solvent having oxidation resistance as a solvent in the nonaqueous electrolyte solution. Increasing the amount of such fluorinated solvent is thought to enable degradation of the electrolyte solution to be suppressed even when the voltage is raised, making it possible to increase the working voltage.

In this invention, a nonfluorinated cyclic carbonate (A) is used together with a fluorinated cyclic carbonate (B) and a fluorinated acyclic carbonate (C) as the nonaqueous organic solvent making up the nonaqueous electrolyte solution. Because fluorinated carbonate solvents are relatively high-priced, higher cost is unavoidable if the solvent is composed entirely of fluorinated carbonates. However, even in cases where a nonfluorinated cyclic carbonate (A) is used together with a fluorinated carbonate solvent, by adjusting the amount thereof within the above range, oxidative degradation of the nonaqueous electrolyte solution under charging conditions where the maximum achievable potential is 4.5 V or more (vs. Li/Li$^+$) can be better suppressed than when using a nonaqueous electrolyte solution in which the solvent is composed entirely of fluorinated organic solvents. It is possible in this way to ensure the cycle performance and reduce costs.

In a preferred embodiment of the nonaqueous electrolyte secondary battery disclosed herein, the positive electrode is characterized by including, as a positive electrode active material, a lithium-transition metal composite oxide having a spinel structure, which lithium-transition metal composite oxide includes at least nickel and manganese as the transition metal elements.

This positive electrode active material has a high working potential, and so a secondary battery built using this positive electrode active material can be charged to a higher voltage. The battery may, on account of this, enter a state in which oxidative degradation of the nonaqueous electrolyte solution at the positive electrode surface more readily arises. In a battery construction using such a positive electrode active material, the advantageous effects of the invention, that is, the effects of suppressing oxidative degradation of the nonaqueous electrolyte solution and being able to achieve a high cycle performance (e.g., the effect of suppressing deterioration of the battery capacity) are particularly well exhibited.

In a preferred embodiment of the nonaqueous electrolyte secondary battery disclosed herein, the nonaqueous electrolyte solution is characterized by having a volumetric ratio A:B of the nonfluorinated cyclic carbonate (A) to the fluorinated cyclic carbonate (B) in the range of 99:1 to 50:50.

This arrangement, even when compared with cases in which all of the solvent in the nonaqueous electrolyte solution is composed of fluorinated carbonate, makes the nonaqueous electrolyte less likely to oxidatively degrade at the surface of the positive electrode. That is, even under operation at a high potential, and specifically a maximum achievable potential of 4.5 V or more (vs. Li/Li$^+$), the nonaqueous electrolyte solution has an increased oxidation resistance, providing a battery endowed with even better cycle performance.

In a preferred embodiment of the nonaqueous electrolyte secondary battery disclosed herein, the nonaqueous electrolyte solution is characterized by having a volumetric ratio (A+B):C of the nonfluorinated cyclic carbonate (A) and the fluorinated cyclic carbonate (B) combined to the fluorinated acyclic carbonate (C) in the range of 50:50 to 30:70.

This arrangement enables the conductivity characteristics, etc. of the nonaqueous electrolyte solution to be improved without giving rise to the problem of electrolyte insolubility in the nonaqueous electrolyte solution, providing a battery having a low internal resistance.

In a preferred embodiment of the nonaqueous electrolyte secondary battery disclosed herein, the nonfluorinated cyclic carbonate (A) includes ethylene carbonate. Ethylene carbonate does not increase the viscosity of the nonaqueous electrolyte and, even when a carbonaceous material is used as the negative electrode active material, is not readily degraded at the surface of the negative electrode. Therefore, because at least ethylene carbonate is included as the nonfluorinated cyclic carbonate (A), the above effects can be successfully achieved even in a battery that uses a negative electrode active material made of a carbonaceous material.

From this perspective, in the nonaqueous electrolyte secondary battery disclosed herein, the negative electrode may, in a preferred form, include a carbonaceous material as the negative electrode active material.

In one embodiment of the nonaqueous electrolyte secondary battery disclosed herein, it is preferable for the fluorinated cyclic carbonate (B) to include fluoroethylene carbonate. Also, it is preferable for the fluorinated acyclic carbonate (C) to include methyl 2,2,2-trifluoroethyl carbonate. A mixed solvent containing ethylene carbonate, fluoroethylene carbonate and methyl 2,2,2-trifluoroethyl carbonate is more preferred, with a mixed solvent composed of these three carbonates being even more preferred. By having the nonaqueous electrolyte solution be thus constituted, the oxidation resistance of the nonaqueous electrolyte solution can be stabilized still further even under working conditions at a high potential where the maximum achievable potential is 4.5 V or more (vs. Li/Li$^+$).

In the nonaqueous electrolyte secondary battery disclosed herein, the oxidation resistance of the nonaqueous electrolyte solution has been increased to a level capable of tolerating well charging conditions to a maximum achievable potential of 4.5 V or more (vs. Li/Li$^+$). By virtue of this feature, the inventive nonaqueous electrolyte secondary battery can be suitably used as a battery for propelling vehicles such as hybrid vehicles (HV), plug-in hybrid vehicles (PHV) and electric vehicles (EV). That is, owing to this invention, vehicles in which one of the nonaqueous electrolyte secondary batteries disclosed herein (which may be in the form of a battery pack wherein a plurality of the batteries are connected together) have been installed are also provided.

DESCRIPTION OF EMBODIMENTS

Figure 1:
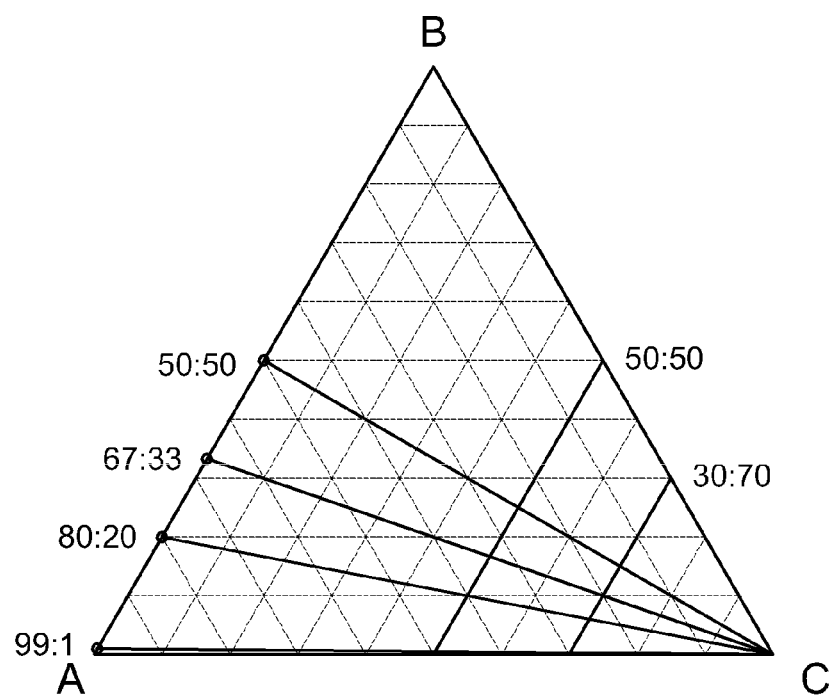
FIG. 1 is a phase diagram showing the composition of the nonaqueous electrolyte solution.

Preferred embodiments of the invention are described below while suitably referring to the diagrams. Relative dimensions (such as length, width and depth) in the respective diagrams may not be true to scale. Matters which are required for carrying out the present invention but are not particularly mentioned in the present specification (e.g., general art relating to the building of batteries, such as the construction and method of producing an electrode assembly having a positive electrode and a negative electrode, the construction and method of producing a separator, the battery (case) shape, etc.) will be understood as matters for design by persons skilled in the art based on prior art in the field to which the invention relates. The present invention can be practiced based on the technical details disclosed in this specification and on common general technical knowledge in the field. In the following diagrams, members or features having like functions are designated by like symbols, and repeated explanations may be omitted or simplified.

The nonaqueous electrolyte secondary battery disclosed herein is described below using, by way of illustration, a lithium ion secondary battery serving as a preferred embodiment. However, this invention is not intended to be limited to lithium secondary batteries. In this specification, "secondary battery" refers generally to a battery which can be repeatedly charged and discharged, and encompasses storage batteries such as lithium secondary batteries. Also, in this specification, "nonaqueous electrolyte secondary battery" refers to a battery having a nonaqueous electrolyte solution (typically, an electrolyte solution which includes a supporting salt within a nonaqueous solvent). In addition, in this specification, "lithium secondary battery" refers to a secondary battery which uses lithium ions (Li ions) as the electrolyte ions and in which charging and discharging are manifested by the movement of charge associated with the Li ions between the positive and negative electrodes. Batteries generally referred to as lithium ion secondary batteries are typical examples encompassed by the lithium secondary battery in this specification.

The nonaqueous electrolyte secondary battery disclosed here includes a positive electrode, a negative electrode and a nonaqueous electrolyte solution.

[Nonaqueous Electrolyte Solution]

The nonaqueous electrolyte solution characteristic to this nonaqueous electrolyte secondary battery may typically be an electrolyte solution obtained by including a supporting salt in a suitable nonaqueous solvent. In the invention disclosed here, this nonaqueous solvent is characterized by including the three types of carbonate solvents indicated below as (A) to (C):

(A) nonfluorinated cyclic carbonate,
(B) fluorinated cyclic carbonate, and
(C) fluorinated acyclic carbonate.

The nonfluorinated cyclic carbonate (A) may be a carbonate compound which has in the chemical structure a carbonate skeleton (O—CO—O) that is closed in the form of a ring by C—C bonds, and which does not include fluorine (F) among the constituent elements. Here, the nonfluorinated cyclic carbonate is preferably a compound in which the number of carbon atoms is from 3 to 8 (more preferably from 3 to 6, such as 3 or 4, and typically 3). If the number of carbon atoms is too high, the viscosity of the nonaqueous electrolyte may rise or the ionic conductivity may decrease. For example, preferred use may be made of the nonfluorinated cyclic carbonate of formula (C1) below.

[Chem 1]

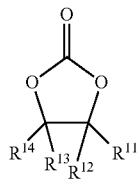

In formula (C1), $R^{11}$, $R^{12}$, $R^{13}$ and $R^{14}$ are each independently selected from among a hydrogen atom, an alkyl group for which the number of carbon atoms is from 1 to 4 (more preferably 1 to 2, and typically 1), a haloalkyl group that does not contain fluorine, and a halogen atom other than fluorine (preferably, a chlorine atom)). The haloalkyl group may be a group having a structure in which 1, 2 or more hydrogen atoms on the alkyl group have been substituted with a halogen atom other than fluorine (e.g., a chlorine atom). $R^{11}$, $R^{12}$, $R^{13}$ and $R^{14}$ are preferably hydrogen atoms or alkyl groups of 1 carbon. Illustrative examples of typical nonfluorinated cyclic carbonates include ethylene carbonate (EC), propylene carbonate (PC) and butylene carbonate (BC). The nonfluorinated cyclic carbonate may be of one type used alone or may be of two or more types used in admixture.

From the standpoint of lowering the viscosity of the nonaqueous electrolyte solution and combination with the subsequently described negative electrode active material, it is especially preferable to use, as this nonfluorinated cyclic carbonate compound, ethylene carbonate (EC) in which $R^{11}$, $R^{12}$, $R^{13}$ and $R^{14}$ are all hydrogen atoms. It is more preferable for ethylene carbonate alone to constitute the nonfluorinated cyclic carbonate. In cases where it is used together with another nonfluorinated cyclic carbonate, ethylene carbonate preferably accounts for 50% by volume or more (typically, 70% by volume or more, and more preferably 80% by volume or more, such as 90% volume or more) of the nonfluorinated cyclic carbonate.

The fluorinated cyclic carbonate (B) may be a compound having a chemical structure wherein $R^{14}$ in above formula (C1) has been substituted with a fluorine atom (F). Specifically, the number of carbon atoms is preferably from 2 to 8 (more preferably from 2 to 6, such as from 2 to 4, and typically 2 or 3). If the number of carbon atoms is too high, as noted above, the viscosity of the nonaqueous electrolyte solution may rise or the ionic conductivity may decrease. For example, preferred use may be made of the fluorinated cyclic carbonate of formula (C2) below.

[Chem 2]

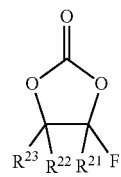

In formula (C2), $R^{21}$, $R^{22}$ and $R^{23}$ are each independently selected from among a hydrogen atom, a fluorine atom, a halogen atom other than fluorine (preferably a chlorine atom), an alkyl group for which the number of carbon atoms is from 1 to 4 (more preferably 1 or 2, and typically 1) and a haloalkyl group. The haloalkyl group may be a group having a structure in which one or two or more hydrogen atoms on the alkyl group have been substituted with halogen atoms (e.g., fluorine atoms or chlorine atoms, and preferably fluorine atoms). Compounds in which one or two from among $R^{21}$, $R^{22}$ and $R^{23}$ are fluorine atoms are preferred. For example, it is preferable for at least one of $R^{22}$ and $R^{23}$ to be a fluorine atom. From the standpoint of lowering the viscosity of the nonaqueous electrolyte solution, it is preferable to use a compound in which $R^{21}$, $R^{22}$ and $R^{23}$ are each fluorine atoms or hydrogen atoms.

Illustrative examples of fluorinated cyclic carbonates include monofluoroethylene carbonate (FEC), difluoroethylene carbonates (DFEC) such as, 4,4-difluoroethylene carbonate and 4,5-difluoroethylene carbonate; trifluoroethylene carbonate, tetrafluoroethylene carbonate, fluoromethylethylene carbonate, difluoromethylethylene carbonate, trifluoromethylethylene carbonate, bis(fluoromethyl)ethylene carbonate, bis(difluoromethyl)ethylene carbonate, bis (trifluoromethyl)ethylene carbonate, fluoroethylethylene carbonate, difluoroethylethylene carbonate, trifluoroethylethylene carbonate and tetrafluoroethylethylene carbonate. Of these, FED and DFEC are more preferred.

The fluorinated acyclic carbonate (C) may be an acyclic (chain-type) carbonate compound which has a carbonate skeleton (O—CO—O) in the chemical structure and which moreover includes fluorine (F) among the constituent elements. Here, a fluorinated acyclic carbonate of formula (C3) below, for example, may typically be used as the nonfluorinated cyclic carbonate.

[Chem 3]

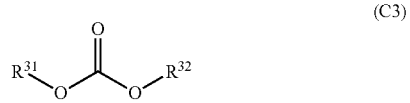

(C3)

In formula (C3), at least one (preferably both) of $R^{31}$ and $R^{32}$ is an organic group containing fluorine, such as a fluorinated alkyl group or a fluorinated alkyl ether group, and may be preferably a fluorinated alkyl group. $R^{31}$ and $R^{32}$ may be fluorinated alkyl groups or fluorinated alkyl ether groups that are further substituted with a halogen atom other than fluorine. One of $R^{31}$ and $R^{32}$ may be an organic group that does not contain fluorine (e.g., an alkyl group or an alkyl ether group). It is preferable for $R^{31}$ and $R^{32}$ to each be an organic group with a number of carbon atoms of from 1 to 6 (more preferably from 1 to 4, such as from 1 to 3, and typically 1 or 2). If the number of carbon atoms is too high, the viscosity of the nonaqueous electrolyte solution may rise or the ionic conductivity may decrease. For the same reason, it is generally preferable for at least one of $R^{31}$ and $R^{32}$ to be linear, and more preferable for both $R^{31}$ and $R^{32}$ to be linear. For example, it is preferable to use a fluorinated acyclic carbonate in which both $R^{31}$ and $R^{32}$ are fluorinated alkyl groups, and in which the total number of carbon atoms for these is 1 or 2.

Illustrative examples of fluorinated acyclic carbonates of formula (C3) include fluoromethyl methyl carbonate, difluoromethyl methyl carbonate, trifluoromethyl methyl carbonate, fluoromethyl difluoromethyl carbonate, bis(fluoromethyl) carbonate, bis(difluoromethyl) carbonate, bis (trifluoromethyl) carbonate, (2-fluoroethyl) methyl carbonate, ethyl fluoromethyl carbonate, (2,2-difluoroethyl) methyl carbonate, (2-fluoroethyl) fluoromethyl carbonate, ethyl difluoromethyl carbonate, (2,2,2-trifluoroethyl) methyl carbonate, (2,2-difluoroethyl) fluoromethyl carbonate, (2-fluoroethyl) difluoromethyl carbonate, ethyl trifluoromethyl carbonate, ethyl (2-fluoroethyl) carbonate, ethyl (2,2-difluoroethyl) carbonate, bis(2-fluoroethyl) carbonate, ethyl (2,2,2-trifluoroethyl) carbonate, ethyl (2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, pentafluoroethyl methyl carbonate, pentafluoroethyl fluoromethyl carbonate, pentafluoroethyl ethyl carbonate and bis(pentafluoroethyl) carbonate.

It is preferable to set the combined amount of carbonates (A) to (C) to typically 90% volume or more (preferably 95% by volume or more, and, typically, substantially 100% by volume) of the total amount of nonaqueous solvent (also referred to below simply as the "mixed solvent") when the supporting salt is excluded from the nonaqueous electrolyte solution. That is, in cases where a nonfluorinated acyclic carbonate such as dimethyl carbonate (DMC), ethyl methyl carbonate (EMC) or diethyl carbonate (DEC) is included, this accounts for 10% by volume or less of the mixed solvent, and may be preferably, for example, an embodiment containing no nonfluorinated acyclic carbonate.

The formulation of the above carbonates (A) to (C) is described below while referring to the phase diagram in FIG. 1. According to general notions up until now, it had been thought that, because carbonate solvents, when completely fluorinated, do not readily oxidize, having a solvent made of fluorinated carbonate is the most effective way to enhance the oxidation resistance of a nonaqueous electrolyte solution. As an increasing amount of nonfluorinated cyclic carbonate (A) is mixed into a solvent obtained by mixing together the fluorinated carbonates, namely, a fluorinated cyclic carbonate (B) and a fluorinated acyclic carbonate (C), the oxidation resistance of the resulting mixed solvent changes with the amount of (A) nonfluorinated cyclic carbonate. Indeed, when the nonfluorinated cyclic carbonate (A) accounts for an amount in the range of from 0% by volume to 10% by volume inclusive, the oxidation resistance decreases as the amount of (A) nonfluorinated cyclic carbonate increases. However, in a range where the nonfluorinated cyclic carbonate (A) accounts for an amount greater than 10% by volume, notwithstanding the decrease in amount of the fluorine that contributes to oxidation resistance, the oxidation resistance tends to rise as the amount of (A) nonfluorinated cyclic carbonate increases. Therefore, in the art disclosed herein, the amount of carbonates (A) to (C) accounted for by the nonfluorinated cyclic carbonate (A)—which is a nonfluorinated carbonate—is characterized by exceeding 10% by volume. The amount of this nonfluorinated cyclic carbonate (A) may be set to preferably 11% by volume or more, such as 12% by volume or more, of the combined amount of (A) to (C).

In the region where the amount accounted for by nonfluorinated cyclic carbonate (A) exceeds 10% by volume, the amount of nonfluorinated cyclic carbonate (A) may be more suitably adjusted while taking into consideration, for example, the balance with the amount of fluorinated cyclic carbonate (B). Specifically, of carbonates (A) to (C), the relative amounts of the cyclic carbonates, that is, of the nonfluorinated cyclic carbonate (A) and the fluorinated cyclic carbonate (B), expressed as the volumetric ratio A:B, is preferably in the range of 99:1 to 50:50. That is, of the cyclic carbonates, the amount of the nonfluorinated cyclic carbonate (A) is from 99% by volume to 50% by volume and the amount of the fluorinated cyclic carbonate (B) is from 1% by volume to 50% by volume; hence, cyclic carbonate that has not been fluorinated is made to account for one-half or more of the amount of cyclic carbonates. With such a composition, it is possible to greatly enhance the oxidation resistance. Surprisingly, the oxidation resistance can be made higher than when the mixed solvent is composed entirely of fluorinated carbonates.

The volumetric ratio A:B of the nonfluorinated cyclic carbonate (A) to the fluorinated cyclic carbonate (B) is preferably in the range of from 80:20 to 50:50 (more preferably from 75:25 to 50:50). When the amount of the cyclic carbonates accounted for by the nonfluorinated cyclic carbonate (A) exceeds 80% by volume, based on the properties of the nonfluorinated cyclic carbonate (A), the freezing point of the nonaqueous electrolyte solution becomes too low. For example, at a low temperature (typically, at about 0° C. or below, such as about −30° C. or below), there arises a possibility that the nonaqueous electrolyte solution will freeze, which is undesirable. The volumetric ratio A:B is more preferably in the range of from 70:30 to 50:50, such as from 67:33 to 50:50. Such a composition is preferable because the oxidation resistance of the electrolyte solution is greatly improved and a battery having a high capacity retention can be built.

Also, of the above carbonates (A) to (C), the volumetric ratio (A+B):C of the sum of the cyclic carbonates, i.e., the nonfluorinated cyclic carbonate (A) and the fluorinated cyclic carbonate (B) combined, to the fluorinated acyclic carbonate (C) is preferably in the range of 50:50 to 30:70. Setting the amount of the overall mixed solvent accounted for by the fluorinated acyclic carbonate to 50% by volume or more is desirable for obtaining a sufficient oxidation resistance. However, when the amount of the fluorinated acyclic carbonate exceeds 70% by volume and is too high, this is undesirable because it may become difficult to fully dissolve the electrolyte serving as the charge carrier within this mixed solvent. The ratio (A+B):C is preferably in the range of 50:50 to 35:65, and more preferably in the range of 50:50 to 40:60.

One or two or more lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$ and $LiI$ may be used as the supporting salt. The supporting salt concentration is not particularly limited, and may be set to a concentration of about 0.1 mol/L to 5 mol/L (e.g., 0.5 mol/L to 3 mol/L, and typically 0.8 mol/L to 1.5 mol/L).

The nonaqueous electrolyte may include optional additives as needed, within limits that do not significantly detract from the objects of the invention. Such additives may be used for such purposes as to increase the power performance of the battery, increase the storage stability (e.g., suppress a drop in capacity during storage), increase the cycle performance and increase the initial charge-discharge efficiency. Examples of preferred additives include fluorophosphates (preferably difluorophosphates, such as lithium difluorophosphate ($LiPO_2F_2$)), and lithium bisoxalate borate (Li-BOB). In addition, use may be made of, for example, additives such as cyclohexylbenzene and biphenyl that can be used to counter overcharging.

It is preferable for the nonaqueous electrolyte solution thus composed to exhibit a working potential which is comparable to or higher than the working potential (maximum achievable potential) (vs. $Li/Li^+$) of the positive electrode active material. Examples of such nonaqueous electrolyte solutions that may be advantageously used include ones for which the difference with the maximum achievable potential (vs. $Li/Li^+$) of the positive electrode active material is larger than 0 V (typically about 0.1 V to about 3.0 V, and preferably about 0.2 V to about 2.0 V, such as about 0.3 V to about 1.0 V), ones for which the above difference is about 0 V to about 0.3 V, and ones for which the above difference is 0.3 V or more (typically about 0.3 V to about 3.0 V, and preferably about 0.3 V to about 2.0 V, such as about 0.3 V to about 1.5 V).

The oxidation potential (vs. $Li/Li^+$) of the electrolyte solution can be measured by the following method. First, a working electrode (WE) is created in the same way as the positive electrodes in the subsequently described working examples using, for example, $LiNi_{0.5}Mn_{1.5}O_4$. A three-electrode electrochemical cell is built using the WE thus produced, metallic lithium as a counter electrode (CE), metallic lithium as a reference electrode (RE), and the electrolyte solution to be measured. Treatment that completely extracts lithium from the WE is carried out on this three-electrode electrochemical cell. Specifically, at a temperature of 25° C., constant-current charging is carried out to 4.5 V at a current value that is $1/5^{th}$ the battery capacity (Ah) predicted from the theoretical capacity of the WE, and constant-voltage charging is carried out at 4.5 V until the current value becomes $1/50^{th}$ the initial current value (that is, a current value that is $1/5^{th}$ of the battery capacity). Next, constant-voltage charging is carried out for a given period of time (e.g., 10 hours) at an arbitrary voltage within a voltage range that is predicted to include the oxidation potential of the electrolyte solution to be measured (typically, a voltage range higher than 4.5 V), and the current value at that time is measured. More specifically, the voltage is increased stepwise (e.g., in 0.2 V steps) within the above voltage range and, in each step, constant-voltage charging is carried out for a given length of time (e.g., about 10 hours) and the current value at that time is measured. The potential when the current value during constant-voltage charging becomes larger than 0.1 mA is treated as the oxidation potential of the electrolyte (oxidative degradation potential).

[Positive Electrode]

In the above nonaqueous electrolyte secondary battery, the positive electrode is characterized by having a maximum achievable potential of 4.5 V (vs. $Li/Li^+$). Such a maximum achievable potential typically can be attained by suitably selecting the positive electrode active material. Specifically, preferred use can be made of a positive electrode active material which has a working potential (vs. $Li/Li^+$) in at some portion of a state-of-charge (SOC) range of 0% to 100% that is higher than for an ordinary lithium secondary battery (wherein the upper limit of the working potential is about 4.2 V) and which has a maximum achievable potential (upper limit of working potential) of 4.5 V or more (vs. $Li/Li^+$). By using such a positive electrode active material, it is possible to achieve a lithium secondary battery in which the positive electrode operates at a high potential of 4.5 V or more (vs. $Li/Li^+$). The upper limit in the working potential (vs. $Li/Li^+$) of the positive electrode active material may be set to preferably 4.6 V or more, and typically 4.7 V or more, such as 5.0 V or more. There is no particular limitation on the upper limit of the working potential (vs. $Li/Li^+$), although consideration may be given to setting this to about 5.5 V or less, such as to about 5.3 V or less.

The value measured as described below may be used as the working potential of the positive electrode active material. A three-electrode electrochemical cell is built using a positive electrode containing the positive electrode active material to be measured as the working electrode (WE), metallic lithium as the counter electrode (CE), metallic lithium as the reference electrode (RE), and an electrolyte solution containing about 1 mol/L of $LiPF_6$ in a mixed solvent of ethylene carbonate (EC):dimethyl carbonate (DMC)=30:70 (volume basis). The SOC value of this cell is adjusted in 5% increments from SOC 0% to SOC 100%, based on the theoretical capacity of the cell. Adjustment of the SOC can be carried out by constant-current charging between the WE and the CE using, for example, an ordinary charge-discharge system or a potentiostat. Next, the potential between the WE and the RE is measured after allowing the cell that has been adjusted to a particular SOC value to stand for one hour. This potential may be treated as the working potential (vs. $Li/Li^+$) of the positive electrode active material at this SOC value.

Generally, at a SOC of between 0% and 100%, the working potential of the positive electrode active material is highest in a range that includes a SOC of 100%. Hence, the upper limit of the working potential of the positive electrode active material (typically, whether or not it is 4.5 V or more) can normally be determined from the working potential of the positive electrode active material at a SOC of 100% (that is, the fully charged state). The working potential of the positive electrode active material at a SOC of 100% (upper limit working potential) (vs. $Li/Li^+$) is preferably higher than 4.4 V, and more preferably 4.5 V or more, such as 4.6 V or more, and typically 4.7 V or more. The art disclosed herein preferably applies to a nonaqueous electrolyte secondary battery in which, typically, the positive electrode active material working potential at a SOC of 100% (upper limit working potential) (vs. Li/Li$^+$) is 7.0 V or less, and typically 6.0 V or less, such as 5.5 V or less.

One or two or more of the various materials known to be capable of use as the positive electrode active material in, for example, lithium secondary batteries may be used without particular limitation as the positive electrode active material. The positive electrode active material may be in a granular form typically having an average particle size of from about 0.5 to about 20 μm (e.g., 2 to 10 μm). In this specification, unless noted otherwise, "average particle size" refers to the median diameter ($D_{50}$) in the volume-basis particle size distribution obtained with a common laser diffraction-type particle size analyzer. The positive electrode active material used may be, for example, a lithium-transition metal composite oxide having a spinel structure or layered structure or a polyanion-type (e.g., olivine-type) lithium-transition metal composite oxide, which composite oxides contain lithium (Li) and at least one transition metal element as the constituent metallic elements.

Illustrative examples of lithium-transition metal composite oxides having a spinel structure include lithium-manganese composite oxides having a spinel structure which contain at least manganese (Mn) as the transition metal. More specific examples include lithium-manganese composite oxides having a spinel structure which are of the general formula $Li_pMn_{2-q}M_qO_{4+\alpha}$. Here, p satisfies the condition $0.9 \le p \le 1.2$; q satisfies the condition $0 \le q < 2$, and typically $0 \le q \le 1$ (e.g., $0.2 \le q \le 0.6$); and α is a value set such that $-0.2 \le \alpha \le 0.2$ and so as to satisfy the charge neutrality condition. When q is larger than 0 ($0 < q$), M may be one or two or more selected from any metallic element or nonmetallic element other than Mn. More specifically, illustrative examples include Na, Mg, Ca, Sr, Ti, Zr, V, Nb, Cr, Mo, Fe, Co, Rh, Ni, Pd, Pt, Cu, Zn, B, Al, Ga, In, Sn, La and Ce. Of these, preferred use can be made of at least one transition metal element such as Fe, Co or Ni. Specific examples of such composite oxides are $LiMn_2O_4$ and $LiCrMnO_4$.

In the art disclosed herein, it is preferable for 50% or more, based on the number of atoms, of the transition metal included in the positive electrode active material to be Mn. Because positive electrode active materials having such a composition use primarily Mn, which is an abundant and inexpensive metal resource, they are preferred from the standpoint of reducing raw material costs and raw material supply risks. There is a tendency in Mn-containing positive electrode active materials (e.g., lithium-manganese composite oxides having a spinel structure) for the Mn to readily leach out of the positive electrode active material. The art disclosed herein (typically, art in which a low-temperature oxide (LTO) layer is provided at a remove from the negative electrode) can be advantageously used in order to suppress the deposition of leached Mn at the negative electrode.

Especially a preferred embodiment includes compounds wherein M in the above general formula includes at least Ni (lithium-nickel-manganese composite oxides). More specific examples include lithium-nickel-manganese composite oxides having a spinel structure of the general formula $Li_x(Ni_yMn_{2-y-z}M^1_z)O_{4+\beta}$. Here, $M^1$ may be any transition metal element other than Ni and Mn or a typical metal element (e.g., one or two or more selected from among Fe, Co, Cu, Cr, Zn and Al). Although not essential, a preferred form of $M^1$ may be one which includes at least one of trivalent Fe and Co. Alternatively, it may be a semimetallic element (e.g., one or two or more selected from among B, Si and Ge) or a nonmetallic element.

Also, x satisfies the condition $0.9 \le x \le 1.2$; y satisfies the condition $0 < y$; z satisfies the condition $0 \le z$; $y + z < 2$ (typically, $y + z \le 1$); and β may be the same as α. In a preferred embodiment, y satisfies the condition $0.2 \le y \le 1.0$ (and more preferably $0.4 \le y \le 0.6$, such as $0.45 \le y \le 0.55$); and z satisfies the condition $0 \le z < 1.0$ (e.g., $0 \le z \le 0.3$).

A specific example of such a lithium-nickel-manganese composite oxide is $LiNi_{0.5}Mn_{1.5}O_4$. By having such a composition, the positive electrode potential at the end of charging can be made a high potential. Typically, this may be set to a high potential of 4.5 V or more (vs. Li/Li$^+$), with 5 V-class lithium secondary batteries being possible to achieve. Compounds of the above composition also have an excellent durability. The question of whether a given positive electrode active material (oxide) has a spinel structure can be determined by x-ray structure analysis (preferably single-crystal x-ray structural analysis). More specifically, this can be confirmed by measurement using an x-ray diffractometer that uses the CuKα beam (wavelength, 0.154051 nm) (such as a single-crystal automatic X-ray structural analysis system from Rigaku Corporation).

Such lithium-manganese composite oxides can be prepared by a hitherto known method and furnished for use. For example, starting compounds (e.g., a lithium source and transition metal element sources containing nickel and manganese) selected according to the final composition are mixed in given ratios, and the mixture is fired by a suitable means. By suitably milling, granulating and classifying the fired mixture, an oxide having the desired properties can be prepared.

Alternatively, the following compounds may be used as the positive electrode active material.

(1) Lithium-transition metal composite oxides of general formula $LiMO_2$ and typically having a layered structure. Here, M includes at least one transition metal element such as Ni, Co and Mn, and may additionally include other metallic elements or nonmetallic elements. Specific examples include $LiNiO_2$ and $LiNi_{1/3}Co_{1/3}Mn_{1/3}O_2$.

(2) Lithium-transition metal composite oxides of the general formula $Li_2MO_3$. Here, M includes at least one transition metal element such as Mn, Fe and Co, and may additionally include other metallic elements or nonmetallic elements. Specific examples include $Li_2MnO_3$ and $Li_2PtO_3$.

(3) Lithium-transition metal compounds of the general formula $LiMPO_4$ (phosphates). Here, M includes at least one transition metal element such as Mn, Fe, Ni and Co, and may additionally include other metallic elements or nonmetallic elements. Specific examples include $LiMnPO_4$ and $LiFePO_4$.

(4) Lithium-transition metal compounds of the general formula $Li_2MPO_4F$ (phosphates). Here, M includes at least one transition metal element such as Mn, Ni and Co, and may additionally include other metallic elements or nonmetallic elements. Specific examples include $LiMnPO_4F$.

(5) Solid solutions of $LiMO_2$ and $Li_2MO_3$. Here, $LiMO_2$ indicates a composition of the general formula mentioned in (1) above, and $Li_2MO_3$ indicates a composition of the general formula mentioned in (2) above. An illustrative example is the solid solution represented as $0.5LiNiMnCoO_2-0.5Li_2MnO_3$.

These positive electrode active materials may be used singly or two or more may be used in combination. The positive electrode active material preferably includes a lithium-manganese composite oxide having a spinel structure (preferably a lithium-nickel-manganese composite oxide) in an amount that accounts for 50% by mass or more (typically, from 50% by mass to 100% by mass, such as from 70% by mass to 100% by mass, and preferably from 80% by mass to 100% by mass) of the total positive electrode active material used. It is more preferable for the positive electrode active material to be substantially composed of a lithium-manganese composite oxide having a spinel structure (preferably a lithium-nickel-manganese composite oxide).

When the above lithium-transition metal composite oxide having a layered structure (layered compound) has a high potential of 4.5 V or more (vs. Li/Li$^+$), the crystal structure breaks down and the transition metals (e.g., Mn) making up the compound tend to gradually leach out into the electrolyte. As a result, with repeated charging and discharging, the battery capacity may gradually decline and the durability may worsen. From this standpoint, in another preferred embodiment, the positive electrode active material may be one which contains substantially no layered compound. More specifically, it is desirable for the layered compound to account for 5% by mass or less, typically 2% by mass or less, and preferably 1% by mass or less (more preferably 0.1% by mass or less) of the overall positive electrode active material.

If necessary, the positive electrode active material may be bonded with a conductive material using a binder to form a positive electrode active material layer on the surface of the positive electrode current collector in a lithium secondary battery. The positive electrode current collector is preferably an electrically conductive member composed of a metal having a good electrical conductivity, such as aluminum or an alloy composed primarily of aluminum. The shape of the positive electrode current collector may differ according to the shape and other characteristics of the battery, and thus is not particularly limited. For example the current collector may be in the form of a rod, plate, sheet, foil or mesh. The thickness of the positive electrode current collector also is not particularly limited, and may be set to, for example, from 8 μm to 30 μm. In addition to a positive electrode active material, the positive electrode active material layer may include also additives such as a conductive material and a binder.

Any of various carbon materials may be advantageously used as the conductive material. More specifically, this may be one or two or more selected from among such carbon materials as various carbon blacks, coke, activated carbon, graphite (natural graphite, artificial graphite), carbon fibers, carbon nanotubes, fullerenes, and graphenes. Of these, preferred use can be made of a carbon black having a relatively small particle size and a large specific surface area (typically, acetylene black). Alternatively, the conductive material may be a metal powder such as copper or nickel, or an organic electrically conductive material such as a polyphenylene derivative. These may be used singly or as mixtures of two or more thereof.

The binder is exemplified by various types of polymeric materials. For example, in cases where the positive electrode active material layer is formed using an aqueous composition (a composition in which water or a mixed solvent composed primarily of water is used as the dispersion medium for the active material particles), a water-soluble or water-dispersible polymeric material may be advantageously used as the binder. Examples of water-soluble or water-dispersible polymeric materials include cellulose-based polymers such as carboxymethyl cellulose (CMC), polyvinyl alcohol (PVA), fluoroplastics such as polytetrafluoroethylene (PTFE), vinyl acetate polymers, rubbers such as styrene-butadiene rubber (SBR), and acrylic acid-modified SBR resins (SBR latex). Alternatively, in cases where the positive electrode active material layer is formed using a solvent-based composition (a composition in which the dispersion medium for the active material particles is primarily an organic solvent), use can be made of a variety of polymeric materials, including vinyl halide resins such as polyvinylidene fluoride (PVdF) and polyvinylidene chloride (PVdC), and polyalkylene oxides such as polyethylene oxide (PEO). Such binders may be used singly or two or more may be used in combination. The polymeric materials mentioned above, aside from being used as binders, may also be used as thickening agents for the positive electrode active material layer-forming composition or as other additives.

The method of producing the positive electrode is not particularly limited; a known method may be suitably used for this purpose. For example, the positive electrode can be produced by the following method. First, a paste-like or slurry-like positive electrode active material layer-forming composition is prepared by mixing a positive electrode active material and, if necessary, a conductive material, a binder and the like in a suitable solvent (an aqueous solvent, a nonaqueous solvent, or a mixed solvent thereof). The mixing operation may be carried out using, for example, a suitable mixing apparatus (e.g., planetary mixer). Both aqueous solvents and nonaqueous solvents may be used as the solvent for preparing the composition. The aqueous solvent should be one that exhibits aqueous properties overall; preferred use can be made of water or a mixed solvent composed primarily of water. Preferred examples of nonaqueous solvents include N-methyl-2-pyrrolidone (NMP), methyl ethyl ketone and toluene.

The composition thus prepared is coated onto the positive electrode current collector and, after vaporizing off the solvent by drying, is pressed. Techniques similar to hitherto known methods may be suitably used as the method of coating the composition onto the positive electrode current collector. For example, the composition can be suitably coated onto the positive electrode current collector using a suitable coating device such as a die coater. With regard to drying the solvent, good drying is possible by using any of the following methods, either alone or in combination: air drying, hot-air drying, low-moisture air drying, vacuum drying, infrared drying, far-infrared drying and electron-beam drying. In addition, the pressing method used may be a hitherto-known pressing method such as roll pressing or flat plate pressing. With regard to thickness adjustment, pressing may be carried out a plurality of times until the desired thickness is reached after measuring the thickness with a film thickness gauge and adjusting the pressing pressure. A positive electrode in which a positive electrode active material layer has been formed on a positive electrode current collector is thus obtained.

The amount of the positive electrode active material as a proportion of the overall positive electrode active material layer is suitably set to about 50% by mass or more (typically from 50% by mass to 95% by mass), and is preferably set to generally from about 70% by mass to about 95% by mass. The amount of the conductive material as a proportion of the positive electrode active material layer may be set to, for example, from about 0.1 part by mass to 20 parts by mass per 100 parts by mass of the positive electrode active material, and is preferably set to generally from about 1 part by mass to about 15 parts by mass (e.g., from 2 parts by mass to 10 parts by mass, and typically from 3 parts by mass to 7 parts by mass). The amount of the binder as a proportion of the positive electrode active material layer may be set to, for example, from among 0.5 part by mass to 10 parts by mass per 100 parts by mass of the positive electrode active material, and is preferably set to generally from about 1 part by mass to about 8 parts by mass (e.g., 2 parts by mass to 7 parts by mass, and typically 2 parts by mass to 5 parts by mass).

The thickness of the positive electrode active material layer may be set to, for example, 20 μm or more (typically, 50 μm or more) and 200 μm or less (typically, 100 μm or less). The density of the positive electrode active material layer is not particularly limited, and may be set to, for example, 1.5 g/cm$^3$ or more (typically, 2 g/cm$^3$ or more) and 4.5 g/cm$^3$ or less (typically, 4.2 g/cm$^3$ or less). A positive electrode active material layer which satisfies the above range is able to achieve a high battery performance (e.g., high energy density and power density).

<Negative Electrode>

As for the negative electrode (e.g., negative electrode sheet), the negative electrode active material is optionally bonded with a conductive material using a binder and fixed to the surface of a negative electrode current collector, thereby forming a negative electrode active material layer. As in conventional lithium secondary batteries, preferred use may be made of an electrically conductive member composed of a metal having good conductivity, such as copper or an alloy composed primarily of copper, as the negative electrode current collector. The shape of the negative electrode current collector may differ according to the shape and other characteristics of the battery, and thus is not particularly limited. For example the current collector may be in the form of a rod, plate, sheet, foil or mesh. The thickness of the negative electrode current collector also is not particularly limited, and may be set to, for example, from about 8 μm to about 30 μm.

The negative electrode active material layer includes a negative electrode active material which is capable of intercalating and deintercalating the lithium ions serving as the charge carrier. The composition and shape of the negative electrode active material is not particularly limited; use may be made of one or two or more materials hitherto used in lithium secondary batteries. The negative electrode active material may be in the form of granules typically having an average particle size of from about 1 μm to about 20 μm (e.g., from 4 μm to 10 μm). Such a negative electrode active material is exemplified by, for example, the carbon materials commonly used in lithium secondary batteries. Typical examples of such carbon materials include graphite carbon (graphite) and amorphous carbon. Preferred use may be made of granular carbon materials (carbon particles) containing a graphite structure (layered structure) in at least a portion thereof. The use of a carbon material composed primarily of natural graphite is especially preferred. The natural graphite may be flake graphite that has been spheronized. Alternatively, use may be made of a carbonaceous powder obtained by coating the surface of graphite with amorphous carbon. It is also possible to use, as the negative electrode active material, oxides such as lithium titanate, silicon materials, tin materials or the like in uncombined form or as alloys or compounds, and also composite materials which use the above materials in combination. Of these, the use of a negative electrode active material having a reducing potential (vs. Li/Li$^+$) of about 0.5 V or less (e.g., 0.2 V or less, and typically 0.1 V or less) is especially preferred. By using a negative electrode active material having such a reducing potential, a high energy density can be achieved. Examples of material that are capable of having such a low potential include graphitic carbon materials (typically, graphite particles).

Any of the various types of polymeric materials that may be included in the positive electrode active material layer can be advantageously used here as the binder. Examples include polymeric materials which dissolve or disperse in an aqueous composition or a solvent-based composition. Such binders, aside from being used as the binder, may also be used as thickeners and other additives for paste-like (which may be ink-like or slurry-like) negative electrode active material layer-forming compositions.

The method of producing the negative electrode is not particularly limited; use can be made of a conventional method. For example, production may be carried out by the following method. First, the negative electrode active material is mixed together with a binder or the like in the suitable solvent described above (an aqueous solvent, an organic solvent, or a mixed solvent thereof), thereby preparing a negative electrode active material layer-forming composition in the form of a paste or slurry. The composition thus prepared is coated onto a negative electrode current collector and, after vaporizing off the solvent by drying, is pressed. Using the composition, the negative electrode active material layer can in this way be formed on the negative electrode current collector, enabling a negative electrode provided with this negative electrode active material layer to be obtained. The mixing, coating, drying and pressing methods used may be the same as those used in producing the positive electrode.

It is suitable to set the amount of the negative electrode active material as a proportion of the overall negative electrode active material layer to generally about 50% by mass or more, and preferably from 90% by mass to 99% by mass (e.g., from 95% by mass to 99% by mass). When the binder is used, the amount of binder as a proportion of the negative electrode active material layer may be set to, for example, from 1 part by mass to 10 parts by mass per 100 parts by mass of the negative electrode active material; generally, it is suitable to set this to from about 1 part by mass to about 5 parts by mass.

By subjecting the negative electrode to suitable pressing treatment, the thickness and density of the negative electrode active material layer can be adjusted. The thickness of the negative electrode active material layer following pressing treatment may be set to, for example, 20 μm or more (typically, 50 μm or more) and 200 μm or less (typically, 100 μm or less). The density of the negative electrode active material layer is not particularly limited, although it may be set to, for example, 0.8 g/cm$^3$ or more (typically, 1.0 g/cm$^3$ or more) and 1.6 g/cm$^3$ or less (typically, 1.5 g/cm$^3$ or less, such as 1.4 g/cm$^3$ or less).

<Separator>

A separator (separator sheet) which is disposed so as to separate the positive electrode and the negative electrode may be a member which electrically isolates the positive electrode active material layer from the negative electrode active material layer and also allows movement of the electrolyte. The separator used may be one that is similar to the sheet used as a separator in conventional lithium secondary batteries. Examples of such members include porous materials, nonwoven fabric-type materials and fabric-type materials. Of these, preferred use can be made of a porous sheet (porous resin sheet) made of resin.

Suitable examples of porous resin sheets include sheets that are primarily composed of thermoplastic resins such as a polyolefin (e.g., polyethylene (PE), polypropylene (PP)), polyester or polyamide. Preferred examples include sheets having a single-layer or multilayer structure composed primarily of one or two or more polyolefin resins (polyolefin sheets). For example, preferred use can be made of a sheet having a three-layer structure (PP/PE/PP structure) made up of a PE sheet and PP sheets, wherein PP layers are arranged on either side of a PE layer. The PE may be any of the polyethylenes commonly referred to as high-density polyethylene (HDPE), low-density polyethylene (LDPE) and straight-chain (linear) low-density polyethylene (LLDPE), or mixtures thereof. If necessary, the separator may also include additives such as various plasticizers, antioxidants and the like.

The resin sheet making up the separator having a single-layer structure or a multilayer structure is preferably, for example, a monoaxially stretched or biaxially stretched porous resin sheet. Of these, a porous resin sheet that has been monoaxially stretched in the lengthwise direction is especially preferred because it has a suitable strength and undergoes little heat shrinkage in the crosswise direction. By using a separator having a monoaxially stretched porous resin sheet, heat shrinkage in the machine direction also can be suppressed in embodiments where the separator has been wound together with a positive electrode and negative electrode in the form of elongated sheets. Therefore, a porous resin sheet that has been monoaxially stretched in the lengthwise direction is especially preferred as an element of the separator making up such a wound electrode assembly.

The separator thickness, although not particularly limited, is preferably from about 5 µm to about 40 µm (e.g., from 10 µm to 30 µm, and typically form 15 µm to 25 µm). At a separator thickness within this range, the ionic permeability of the separator is even better and film rupture is less likely to occur. A heat-resistance layer may be formed in the separator. In cases where, for example, a solid (gel-like) electrolyte obtained by adding a polymer to the above electrolyte is used instead of a liquid electrolyte, because the electrolyte itself is able to serve as the separator, there may be no need for a separator.

<Lithium Secondary Battery>

Next, the overall construction of a nonaqueous electrolyte secondary battery provided with structural elements that include the above-described positive electrode and nonaqueous electrolyte solution is explained using, by way of illustration, a lithium secondary battery.

Figure 2:
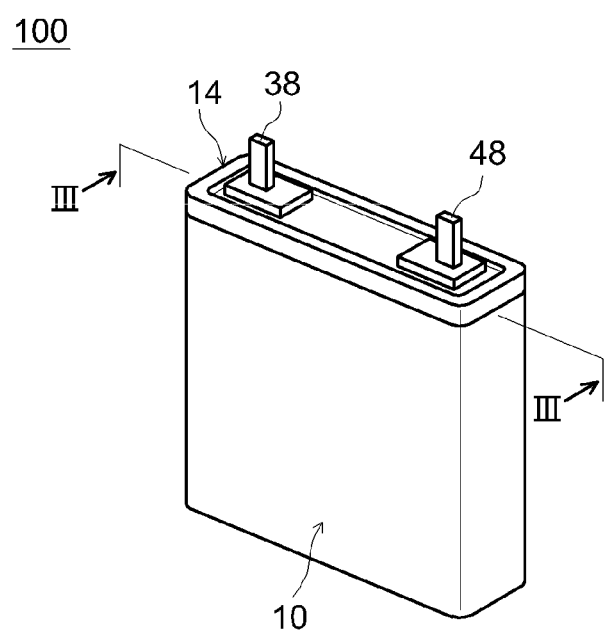
FIG. 2 is a perspective view schematically showing the construction of a nonaqueous electrolyte secondary battery according to one embodiment.
Figure 3:
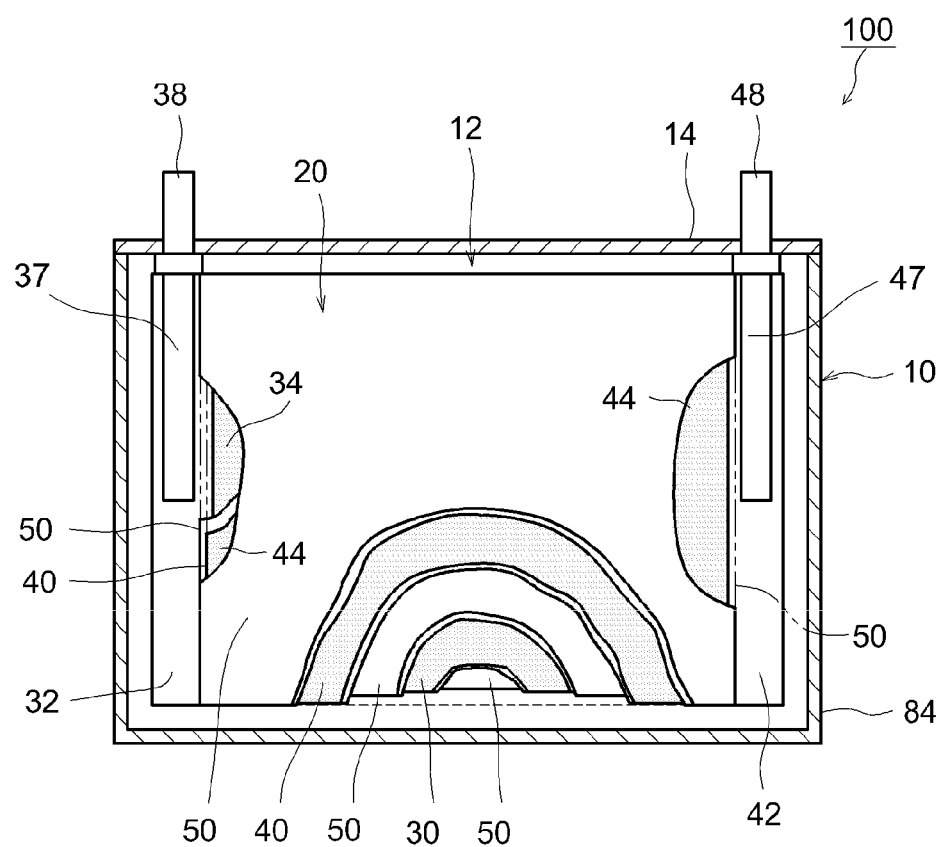
FIG. 3 is a cross-sectional view taken along line III-III in FIG. 2.

As shown in FIGS. 2 and 3, a lithium secondary battery 100 is provided with a battery case 10 in the shape of a prismatic box, and a wound electrode assembly 20 housed within the battery case 10. The battery case 10 has an opening 12 on a top side thereof. This opening 12 is closed with a lid 14 after the wound electrode assembly 20 has been placed within the battery case 10 through the opening 12. A nonaqueous electrolyte solution (not shown) is also placed within the battery case 10. An external positive electrode terminal 38 and an external negative electrode terminal 48 for connection to the exterior are provided on the lid 14. A portion of each of these terminals 38, 48 protrudes onto the surface side of the lid 14. In addition, a portion of the external positive electrode terminal 38 is connected to an internal positive electrode terminal 37 at the interior of the battery case 10, and a portion of the external negative electrode terminal 48 is connected to an internal negative electrode terminal 47 at the interior of the battery case 10.

Figure 4:
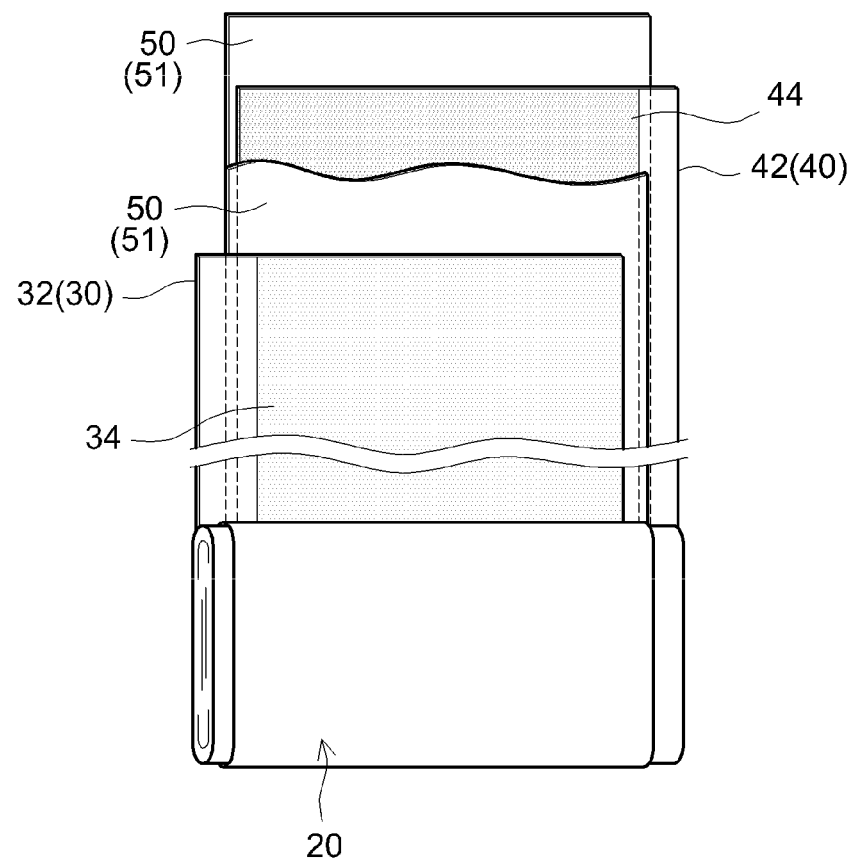
FIG. 4 is a perspective view schematically showing the state in which an electrode assembly according to one embodiment is wound and produced.

As shown in FIG. 4, the wound electrode assembly 20 has an elongated sheet-shaped positive electrode (positive electrode sheet) 30 and an elongated sheet-shaped negative electrode (negative electrode sheet) 40. The positive electrode sheet 30 is provided with an elongated positive electrode current collector 32 and, formed on at least one surface (typically both surfaces) thereof, a positive electrode active material layer 34. The negative electrode sheet 40 is provided with an elongated negative electrode current collector 42 and, formed on at least one surface (typically both surfaces) thereof, a negative electrode active material layer 44. The wound electrode assembly 20 also has two sheet-shaped separators (separator sheets) 50. The positive electrode sheet 30 and the negative electrode sheet 40 are arranged as successive layers (stacked) in a state where they are electrically isolated from each other by the two separator sheets 50, such as being arranged, from the top side of the stack in FIG. 4, in the following order: positive electrode sheet 30, separator sheet 50, negative electrode sheet 40, separator sheet 50. The stack is formed into a wound body by winding in the lengthwise direction, and the wound body is pressed and flattened from the lateral direction to form a flattened shape. The electrode assembly is not limited to a wound electrode assembly 20. For example, it may be a stacked electrode assembly obtained by stacking together a positive electrode sheet 30, a negative electrode sheet 40 and a separator sheet 50 of a given shape. Alternatively, other appropriate shapes and structures may be suitably used according to the shape of the battery and its intended use.

Here, the positive electrode sheet 30 has provided, at a first edge in the width direction, a portion where the positive electrode active material layer 34 has not been formed and the positive electrode current collector 32 is exposed (positive electrode active material layer-less area). Also, the negative electrode sheet 40 has provided, at a second edge in the width direction, a portion where the negative electrode active material layer 44 has not been formed and the negative electrode current collector 42 is exposed (negative electrode active material layer-less area). The positive electrode active material layer-less area and the negative electrode active material layer-less area are arranged so as to protrude from the edges on mutually opposing sides in the width direction of the wound electrode assembly 20 (direction perpendicular to the winding direction). Here, the negative electrode active material layer 44 is formed wider than the positive electrode active material layer 34 so as to cover the positive electrode active material layer 34 in the width direction. Also, the separator sheet 50 has a width which is larger than the widths of the stacked portions of the positive electrode active material layer 34 and the negative electrode active material layer 44, and smaller than the width of the wound electrode assembly 20.

<Capacity Ratio Between Positive Electrode and Negative Electrode>

Although not particularly limited, it is generally appropriate to set the ratio $C_a/C_c$ of the negative electrode capacity ($C_a$ (mAh)), calculated as the product of the theoretical capacity per unit mass of the negative electrode active material (mAh/g) multiplied by the mass of the negative electrode active material (g), to the positive electrode capacity ($C_c$ (mAh)), calculated as the product of the theoretical capacity per unit mass of the positive electrode active material (mAh/g) multiplied by the mass of the positive electrode active material (g), to, for example, from 1.0 to 2.0, and preferably from 1.2 to 1.9 (e.g., from 1.7 to 1.9). The ratio between the capacities of the opposing positive and negative electrodes directly affects battery capacity (or irreversible capacity) and energy density and, depending on the service conditions, etc. (e.g., high-speed charging) of the battery, may lead to lithium deposition. By setting the capacity ratio of the opposing positive and negative electrodes in the above range, lithium deposition can be suitably suppressed while satisfactorily maintaining battery characteristics such as battery capacity and energy density.

A battery 100 can be built by placing the wound electrode assembly 20 prepared as described above and a nonaqueous electrolyte solution in the battery case 10. Typically, a nonaqueous electrolyte secondary battery 100 can be obtained by placing the wound electrode assembly 20 in the battery case 10 and sealing, then injecting the nonaqueous electrolyte solution through a fill port or the like provided in the battery case 10 and closing the fill port.

<Vehicle>

Figure 6:
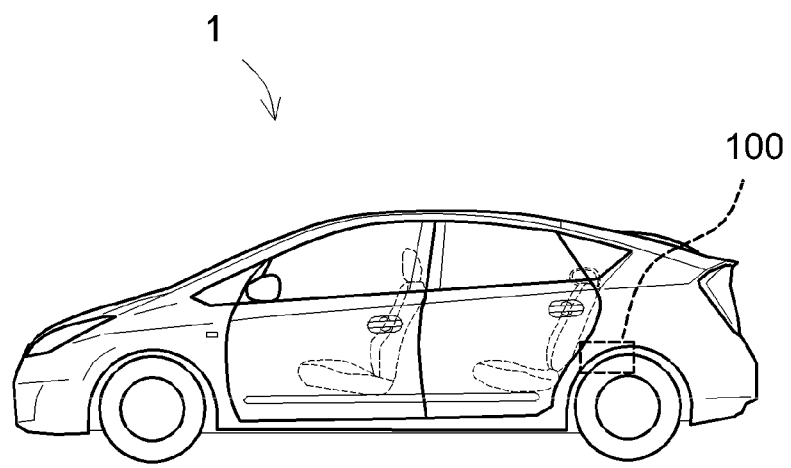
FIG. 6 is a side view schematically showing a vehicle equipped with a nonaqueous electrolyte secondary battery according to one embodiment.

Because a lithium secondary battery that has been built in this way has a highest achievable potential at the positive electrode of 4.5 V or more, it is provided as a battery capable of achieving a high energy density. Moreover, the nonaqueous electrolyte solution, even when exposed to a positive electrode at such a high voltage, does not readily incur oxidative degradation and is stable, enabling the battery to have an excellent cycle performance. Therefore, such secondary batteries, as exemplified in FIG. 6 for example, can be installed in a vehicle 1 such as a car and advantageously used as a power supply for a drive source such as a motor that propels the vehicle 1. From such a standpoint, the invention is able to provide a vehicle 1 (typically, an automobile, and in particular an automobile having an electric motor, such as a hybrid vehicle (HV), plug-in hybrid vehicle (PHV), electric vehicle (EV) or fuel cell car) having the above-described lithium secondary battery (typically, a battery pack in which a plurality of such batteries are connected in series) 100 as a power source.

Next, a number of working examples of the invention are described, although the invention is not intended to be limited to what is shown in the examples.

Example 1

Preparation of Nonaqueous Electrolyte Solutions a to k

In this example, Nonaqueous Electrolyte Solutions a to k were prepared by dissolving about 1 mol/L of $LiPF_6$ as the supporting salt in mixed solvents of the nine Formulations a to k shown in Table 1.

The mixed solvents shown as Formulations a to k were obtained by using ethylene carbonate (EC) as the nonfluorinated cyclic carbonate (A), fluoroethylene carbonate (FEC) as the fluorinated cyclic carbonate (B) and methyl 2,2,2-trifluoroethyl carbonate (MTFEC) as the fluorinated acyclic carbonate (C), and ethyl methyl carbonate (EMC) as another solvent, and mixing these in the proportions (% by volume) shown in Table 1.

[Evaluation of Oxidation Resistance]

Each of Nonaqueous Electrolyte Solutions a to k was subjected to measurement of the leakage current after being held at a high temperature in a voltage applied state in accordance with the electrolyte test method disclosed in Patent Document 3. This electrolyte test method involves measuring the leakage current of the electrolyte solution in a voltage applied state using a working electrode provided with a positive electrode active material, and is capable of accurately determining the oxidation resistance of the electrolyte solution in a nonaqueous electrolyte secondary battery.

Figure 5:
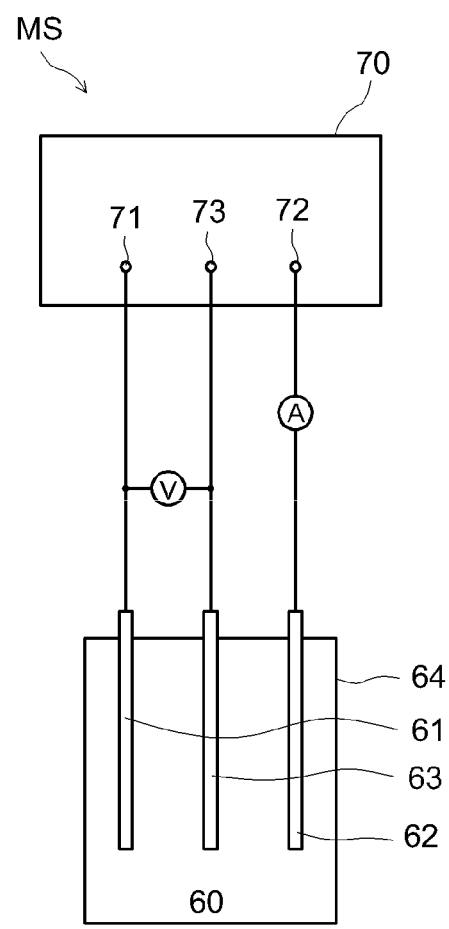
FIG. 5 is a diagram schematically showing the construction of an apparatus used for evaluating electrolyte solutions.

Specifically, (1) the electrolyte measurement system MS shown in FIG. 5 was prepared for use in a 60° C. environment. That is, first, the nonaqueous electrolyte solution that had been left to stand for 2 hours or more in a 60° C. environment was injected into the electrolyte receptacle 64 of a three-electrode cell 60. Next, the working electrode 61, counter electrode 62 and reference electrode 63 were each immersed in the nonaqueous electrolyte solution in a mutually spaced apart state. A positive electrode plate containing lithium-nickel-manganese composite oxide ($LiNi_{0.5}Mn_{1.5}O_4$) as an active material having a spinel structure was used as the working electrode 61, a negative electrode plate provided with graphite as the active material was used as the counter electrode 62, and metallic lithium was used as the reference electrode 63. The working electrode 61, the counter electrode 62 and the reference electrode 63 were then electrically connected to, respectively, a working electrode terminal 71, a counter electrode terminal 72 and a reference electrode terminal 73 on a potentiostat 70.

In the next step (2), lithium ions were completely extracted beforehand from the positive electrode active material of the working electrode 61 that was placed at the interior of the electrolyte receptacle 64. Because the high-potential positive electrode material $LiNi_{0.5}Mn_{1.5}O_4$ was used as the positive electrode active material, the potential of the working electrode 61 (working electrode potential E1) was set to 5.0 V (vs. $Li/Li^+$) by applying a voltage between the working electrode 61 and the counter electrode 62 in a 60° C. environment, and the lithium ions were completely extracted from the positive electrode active material. The potential (E1) of the working electrode 61 was then subsequently maintained at 5.0 V for 72 hours in a 60° C. environment.

Next, (3) after the 5.0 V charged state had been maintained for 72 hours in a 60° C. environment, the leakage current (mA) of each nonaqueous electrolyte solution was measured. By thus making the working electrode potential E1 of the working electrode 61 high at an elevated temperature, when oxidative degradation arises in the electrolyte, a current (oxidative degradation current) flows between the working electrode 61 and the counter electrode 62. The measurement results for the leakage current are shown in Table 1.

TABLE 1

| Formulation | Amounts (vol %) | | | | Leakage current (mA) |
| --- | --- | --- | --- | --- | --- |
| | (A): EC | (B): FEC | (C): MTFEC | Other | |
| a | 30 | — | — | 70 | 0.185 |
| b | — | 50 | 50 | — | 0.152 |
| c | 10 | 40 | 50 | — | 0.336 |
| d | 25 | 25 | 50 | — | 0.149 |
| e | 30 | 20 | 50 | — | 0.114 |
| f | 40 | 10 | 50 | — | 0.069 |
| g | 20 | 20 | 60 | — | 0.154 |
| h | 25 | 15 | 60 | — | 0.072 |
| i | 15 | 15 | 70 | — | 0.147 |
| j | 20 | 10 | 70 | — | 0.073 |
| k | 50 | — | 50 | — | 0.075 |

A small leakage current value in Table 1 indicates that there are few side reactions on (degradation of) the electrolyte solution at the surface of the positive electrode, meaning that the nonaqueous electrolyte solution has a high oxidation resistance.

From a comparison of Nonaqueous Electrolyte Solution a in which the mixed solvent shown in Formulation a was used with Nonaqueous Electrolyte Solution b in which the mixed solvent shown in Formulation b was used, it was confirmed that by using a fluorinated carbonate in the solvent, such as, in this case, having the solvent be a 100% fluorinated carbonate solvent, a stable nonaqueous electrolyte solution which does not readily incur degradation and has excellent oxidation resistance even under high-voltage battery service conditions at a 5V level can be achieved.

From comparisons of Nonaqueous Electrolyte Solutions b to f and k in which the mixed solvents of Formulations b to f and k were used, it was confirmed that the oxidation resistance decreases when a nonfluorinated carbonate (A) is included but that, in the Formulations c to f region, contrary to what one would expect from the results for a and b above, the oxidation resistance tends to rise as the amount of fluorinated cyclic carbonate (B) decreases and the amount of nonfluorinated cyclic carbonate (A) increases. However, it was also found that this effect stops rising at about Formulation f, and that when the amount of nonfluorinated carbonate (A) increases up to Formulation k, the oxidation resistance once again decreases.

From comparisons of Formulations d, g and i, which contain equal amounts of (A) a nonfluorinated cyclic carbonate (EC) and (B) a fluorinated cyclic carbonate (FEC), with Formulation b, it was confirmed that in this formulation region, in spite of including a nonfluorinated carbonate, the leakage current is smaller and the oxidation resistance is higher than in the case of Formulation b which is 100% composed of fluorinated carbonates.

Overall, it was confirmed that, in cases where mixed solvents in the region of Formulations b, e, f, h, j and k were used, the leakage current is held lower than in the case of Formulation b which is 100% composed of fluorinated carbonate and that, even under high-potential battery service conditions at the 5 V level, a stable nonaqueous electrolyte solution having excellent oxidation resistance is obtained.

[Evaluation of Low Temperature Properties]

Nonaqueous Electrolyte Solutions a to k containing mixed solvents of above Formulations a to k were left to stand in a −30° C. environment, and their condition was observed. In the case of Formulations f and k having a high content of EC, which is a nonfluorinated cyclic carbonate (A), freezing of the nonaqueous electrolyte solution itself was confirmed. That is, as can be seen with EC, because nonfluorinated cyclic carbonates (A) have relatively high freezing points (38° C. in the case of EC), it was possible to confirm that the freezing point of the electrolyte solution itself also rose. In applications such as cars, where there is a possibility that the battery will be left standing outside at a low temperature of −30° C., in order to ensure the battery characteristics at low temperature, it was confirmed to be preferable to set the relative amounts of (A) nonfluorinated cyclic carbonate: (B) fluorinated cyclic carbonate such that the amount of nonfluorinated cyclic carbonate (A) is lower than in Formulation f and, specifically, is in a range of, for example, from 65:35 to 50:50.

[Preparation of Nonaqueous Electrolyte Solutions l and m]

Nonaqueous Electrolyte Solutions l and m were prepared by dissolving about 1 mol/L of $LiPF_6$ as the supporting salt in mixed solvents of Formulations l and m in which the relative amounts of fluorinated cyclic carbonate (B) and fluorinated acyclic carbonate (C) were varied as shown in Table 2 below. The conductivities of these Nonaqueous Electrolyte Solutions l and m were measured in a 25° C. environment and are shown in Table 2. For the sake of reference, the conductivity of Nonaqueous Electrolyte Solution b prepared as described above was measured as well and is also shown in Table 2.

A general-purpose conductivity measuring apparatus was used to measure conductivity.

TABLE 2

| Formulation | Amounts (vol %) | | Conductivity (mS/cm) |
| --- | --- | --- | --- |
| | (B): FEC | (C): MTFEC | |
| l | 70 | 30 | 5.6 |
| b | 50 | 50 | 5.0 |
| m | 30 | 70 | 3.8 |

As shown in Table 2, it was possible to confirm that, as the amount of fluorinated cyclic carbonate (B) becomes higher, the conductivity also rises. However, the amount of increase in conductivity was larger when the amount of fluorinated cyclic carbonate (B) was increased from 30% by volume in Formulation m to 50% by volume in Formulation b than when it was increased from 50% by volume in Formulation b to 70% by volume in Formulation l.

Also, although not shown in the data here, with regard to nonaqueous electrolyte solutions that used mixed solvents having formulations in the region where the amount of fluorinated cyclic carbonate (B) was less than 30% by volume, $LiPF_6$ as the supporting salt could not be dissolved to a concentration of about 1 mol/L.

It was possible to confirm from these results that the relative amounts of fluorinated cyclic carbonate (B) and fluorinated acyclic carbonate (C), expressed as the volumetric ratio (B):(C), are preferably in the range of 50:50 to 30:70.

Example 2

Production of Positive Electrode Sheet

A paste-like positive electrode active material layer-forming composition was prepared by mixing a lithium-nickel-manganese composite oxide ($LiNi_{0.5}Mn_{1.5}O_4$) having a spinel structure as the positive electrode active material, acetylene black (AB) as the conductive material and polyvinylidene fluoride (PVdF) as the binder in a ratio by mass of 87:10:3 within N-methylpyrrolidone (NMP). This composition was uniformly coated onto both sides of an aluminum foil (positive electrode current collector; thickness, 15 μm) to a total coating weight of 30 mg/cm$^2$ (solids basis) and dried, then subjected to pressing treatment with a roll press, thereby producing a positive electrode in the shape of a sheet.

[Production of Negative Electrode Sheet]

A natural graphite-based material having an average particle size of 20 μm, a lattice constant (Co) in the crystal structure of 0.67 nm, and a crystal thickness (Lc) in the C-axis direction of 27 nm was provided as the negative electrode active material. A paste-like negative electrode active material layer-forming composition was prepared by mixing this negative electrode active material, styrene-butadiene rubber (SBR) as the binder and carboxymethyl cellulose (CMC) as the thickener in a ratio by mass of 98:1:1 within deionized water. This composition was uniformly coated onto both sides of a copper foil (negative electrode current collector; thickness, 14 μm) to a total coating weight of 17 mg/cm$^2$ (solids basis) and dried, then subjected to pressing treatment with a roll press, thereby producing a negative electrode in the shape of a sheet.

The coating weights of the positive electrode and the negative electrode are adjusted so that the theoretical capacity ratio (Cp:Cn) of the lithium secondary battery to be built becomes 1:1.5. Also, the positive electrode and the negative electrode were cut to dimensions that provide the battery with a design capacity of 60 mAh and such as to have tabs (exposed portions of the current collectors).

[Building a Test Battery]

An electrode assembly was formed by arranging the positive electrode and negative electrode cut out as indicated above so as to face each other with a separator in between. The separator used was a separator sheet having a PP/PE/PP three-layer structure (thickness, 20 μm). A lead with a seal was attached to the tab on each electrode.

The electrode assembly thus constructed was placed in a laminate film pouch (a bag), and a nonaqueous electrolyte solution was injected into the pouch. The Nonaqueous Electrolyte Solutions a to f and i to k prepared in Example 1 were used as the nonaqueous electrolyte solution.

The laminate film pouch in which the electrode assembly and the nonaqueous electrolyte solution had been placed was sealed (hermetically sealed) by heat-sealing the opening while pulling a vacuum on the contents and nipping the sealing portion attached to the lead, thereby giving Laminate Batteries 1 to 9 for testing.

<Performance Evaluation>

[Measurement of Initial Capacity]

Each battery was constant-current (CC) charged to 4.9 V at a rate of ⅕C in a 25° C. environment, following which constant-voltage (CV) charging was carried out until the current value became ¹⁄₅₀C, thereby placing the battery in a fully charged state. Then, the capacity exhibited when each battery was constant-current (CC) charged to 3.5 V at a discharge rate of ⅕C was defined as an initial capacity.

[Evaluation of Cycle Performance]

Next, each battery was left at rest for 2 hours or more in a thermostatic chamber set to 60° C., after which the following charge/discharge operations (1) and (2) were repeated for 200 cycles (cycle test).

(1) CC charging to 4.9 V at a rate of 2C, and 10 minutes at rest.

(2) CC discharging to 3.5 V at a rate of 2C, and 10 minutes at rest.

The discharge capacity was subsequently measured by a procedure similar to the method for measuring the initial capacity, and this was treated as the capacity after cycling. Next, the capacity retention (%) was calculated as the ratio of the capacity after cycling relative to the initial capacity ((capacity after cycling/initial capacity)×100(%)). The values obtained (capacity retention) are shown in Table 3.

TABLE 3

| Formulation | Amounts (vol %) | | | | Capacity retention (%) |
| --- | --- | --- | --- | --- | --- |
| | (A): EC | (B): FEC | (C): MTFEC | Other | |
| a | 30 | — | — | 70 | 1.7 |
| b | — | 50 | 50 | — | 48 |
| c | 10 | 40 | 50 | — | 32 |
| d | 25 | 25 | 50 | — | 46 |
| e | 30 | 20 | 50 | — | 53 |
| f | 40 | 10 | 50 | — | 57 |
| i | 15 | 15 | 70 | — | 46 |
| j | 20 | 10 | 70 | — | 56 |
| k | 50 | — | 50 | — | 23 |

As shown in Table 3, lithium ion secondary batteries according to the invention in which were used nonaqueous electrolyte solutions containing mixed solvents of Formulations d to f, i and j were confirmed to exhibit an excellent cycle performance (capacity retention) under high temperature conditions of 60° C.

The invention has been described in detail above by way of embodiments, although it should be noted that these embodiments are provided only by way of illustration and do not in any way limit the scope of the claims. Many variations and modifications to these embodiments may be encompassed by the invention disclosed herein.

REFERENCE SIGNS LIST

1 Automobile (vehicle)
10 Battery case
12 Opening
14 Lid
20 Wound electrode assembly
30 Positive electrode (positive electrode sheet)
32 Positive electrode current collector
34 Positive electrode active material layer
37 Internal positive electrode terminal
38 External positive electrode terminal
40 Negative electrode (negative electrode sheet)
42 Negative electrode current collector
44 Negative electrode active material layer
47 Internal negative electrode terminal
48 External negative electrode terminal
50 Separator (separator sheet)
60 Three-electrode cell
61 Working electrode
62 Counter electrode
63 Reference electrode
64 Electrolyte receptacle
70 Potentiostat
71 Working electrode terminal
72 Counter electrode terminal
73 Reference electrode terminal
100 Lithium secondary battery

The invention claimed is:

1. A nonaqueous electrolyte secondary battery comprising:
   a positive electrode having a maximum achievable potential of 4.5 V or more versus metallic lithium;
   a negative electrode; and
   a nonaqueous electrolyte solution comprising a supporting salt and a nonaqueous solvent;
wherein
   the nonaqueous solvent comprises:
      (A) a nonfluorinated cyclic carbonate containing 3 to 8 carbon atoms;
      (B) a fluorinated cyclic carbonate; and
      (C) a fluorinated acyclic carbonate; and wherein
   the nonfluorinated cyclic carbonate (A), the fluorinated cyclic carbonate (B) and the fluorinated acyclic carbonate (C) are present in an amount of 90% by volume or more in total relative to 100% by volume of a total amount of the nonaqueous solvent,
   the nonfluorinated cyclic carbonate (A) accounts for more than 10% by volume of (A), (B) and (C) combined,
   a volumetric ratio A:B of the nonfluorinated cyclic carbonate (A) to the fluorinated cyclic carbonate (B) is 75:25 to 60:40, and
   a volumetric ratio (A+B):C of the nonfluorinated cyclic carbonate (A) and the fluorinated cyclic carbonate (B) combined to the fluorinated acyclic carbonate (C) is 50:50 to 35:65.

2. The nonaqueous electrolyte secondary battery of claim 1, wherein
   the nonfluorinated cyclic carbonate (A) accounts for 40% by volume or less of the combined amount of the nonfluorinated cyclic carbonate (A), the fluorinated cyclic carbonate (B) and the fluorinated acyclic carbonate (C).

3. The nonaqueous electrolyte secondary battery of claim 1, wherein the nonfluorinated cyclic carbonate (A) includes a compound of formula (C1)

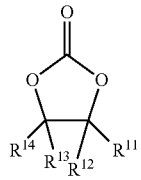

(C1)

where, $R^{11}$, $R^{12}$, $R^{13}$ and $R^{14}$ are each independently selected from among a hydrogen atom, an alkyl group of 1 to 4 carbon atoms, a haloalkyl group that does not include fluorine, and a halogen atom other than fluorine.

4. The nonaqueous electrolyte secondary battery of claim 3, wherein
the nonfluorinated cyclic carbonate (A) includes ethylene carbonate.

5. The nonaqueous electrolyte secondary battery of claim 1, wherein
the fluorinated cyclic carbonate (B) includes a compound of formula (C2)

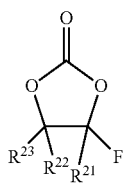

(C2)

where, $R^{21}$, $R^{22}$ and $R^{23}$ are each independently selected from among a hydrogen atom, a fluorine atom, a halogen atom other than fluorine, an alkyl group of 1 to 4 carbon atoms and a haloalkyl group.

6. The nonaqueous electrolyte secondary battery of claim 5, wherein the fluorinated cyclic carbonate (B) includes fluoroethylene carbonate.

7. The nonaqueous electrolyte secondary battery of claim 1, wherein
the fluorinated acyclic carbonate (C) includes a compound of formula (C3)

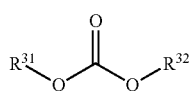

(C3)

where, at least one of $R^{31}$ and $R^{32}$ is an organic group containing fluorine.

8. The nonaqueous electrolyte secondary battery of claim 7, wherein
the fluorinated acyclic carbonate (C) includes methyl 2,2,2-trifluoroethyl carbonate.

9. The nonaqueous electrolyte secondary battery of claim 1, wherein
an oxidation potential of the nonaqueous electrolyte solution is higher than the maximum achievable potential of the positive electrode, wherein
the oxidation potential is determined as a potential when a current value I initially becomes larger than 0.1 mA, measured by: building a three-electrode electrochemical cell that uses the electrolyte solution to be measured and that has a working electrode of $LiNi_{0.5}Mn_{1.5}O_4$, a counter electrode of metallic lithium and a reference electrode of metallic lithium;
constant-current charging the three-electrode electrochemical cell at a temperature of from 25° C. up to 4.5 V at a first current value that is ⅕ of a battery capacity (Ah) calculated from a theoretical capacity of the working electrode;
constant-voltage charging the three-electrode cell at 4.5 V until the current value becomes ¹⁄₅₀ of the first current value; and then
repeatedly measuring the current value I when constant-voltage charging is carried out for 10 hours at a voltage increased by 0.2 V.

10. The nonaqueous electrolyte secondary battery of claim 1, wherein
the positive electrode includes, as a positive electrode active material, a lithium-transition metal composite oxide having a spinel structure, and
the lithium-transition metal composite oxide includes, as transition metal elements, at least nickel and manganese.

11. The nonaqueous electrolyte secondary battery of claim 10, wherein
the lithium-transition metal composite oxide is represented by the general formula: $Li_x(Ni_yMn_{2-y-z}M^1{}_z)O_{4+\beta}$;
where, $M^1$ is one or two or more selected from the group consisting of any transition metal elements other than Ni and Mn, and typical metal elements; x, y and z are values that satisfy the conditions 0.9≤x≤1.2, 0<y, 0≤z and y+z<2; and β is a value that satisfy the conditions −0.2≤β≤0.2 and set to satisfy a charge neutrality condition.

12. The nonaqueous electrolyte secondary battery of claim 1, wherein
the negative electrode comprises, as a negative electrode active material, a carbonaceous material.

* * * * *